Figure 1:
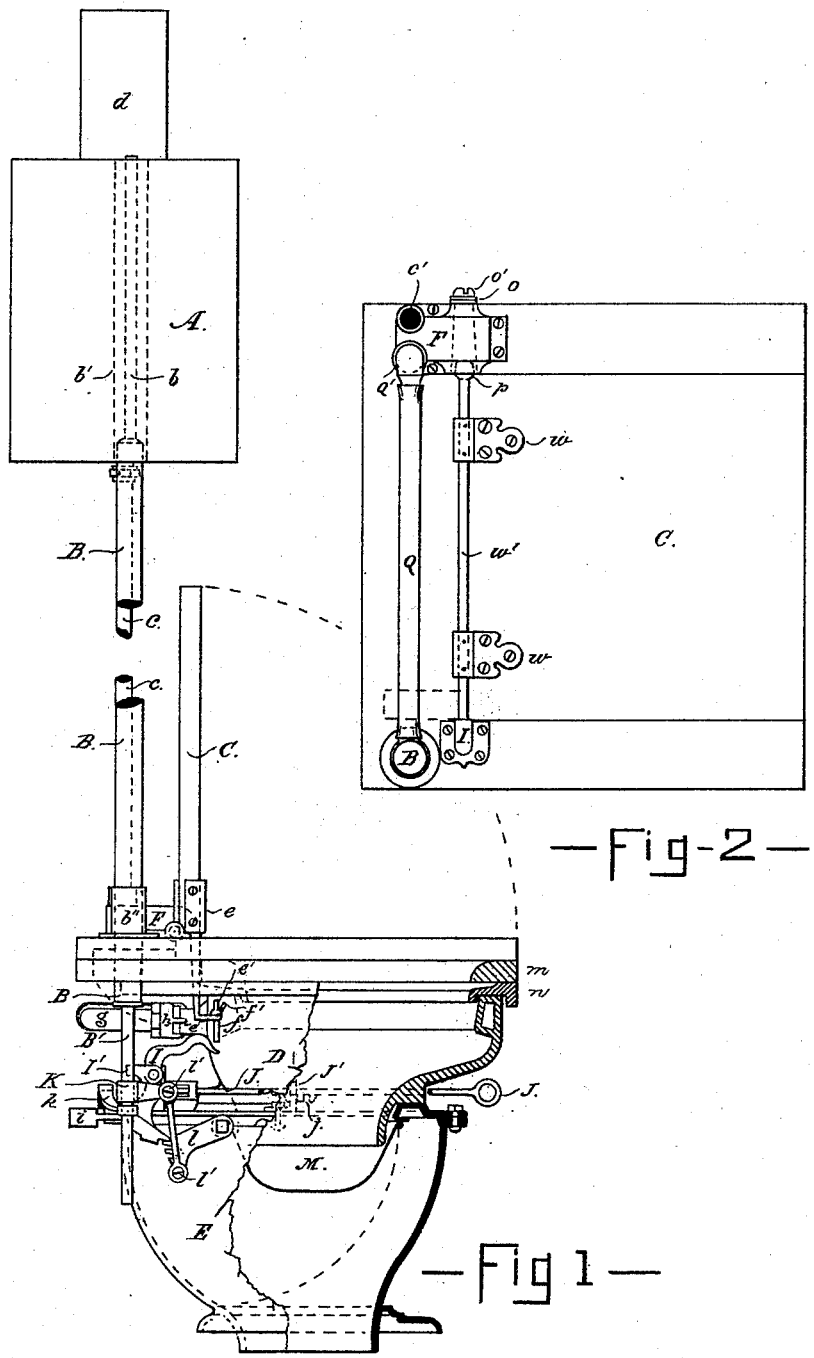

(No Model.) 3 Sheets—Sheet 1.

H. C. HART.
WATER CLOSET.

No. 442,041. Patented Dec. 2, 1890.

Fig-2-

Witnesses.
C. H. Thompson
Gertrude H. Anderson

Inventor.
Henry C. Hart (No Model.) 3 Sheets—Sheet 2.
H. C. HART.
WATER CLOSET.
No. 442,041. Patented Dec. 2, 1890.
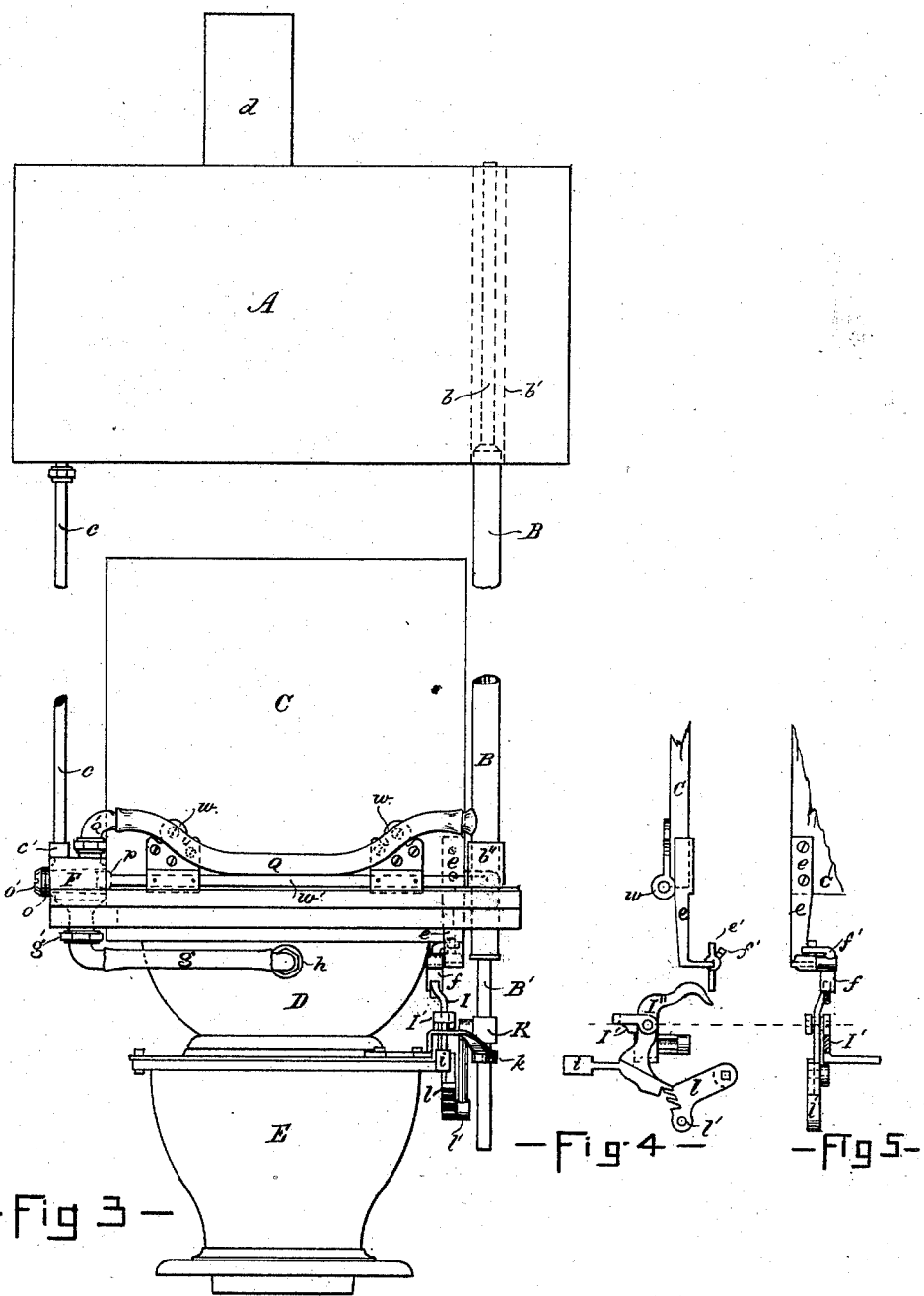
Fig 3 — Fig 4 — Fig 5 —
—WITNESSES—
C. H. Thompson
Gertrude H. Anderson
—INVENTOR—
Henry C. Hart (No Model.) 3 Sheets—Sheet 3.
H. C. HART.
WATER CLOSET.
No. 442,041. Patented Dec. 2, 1890.
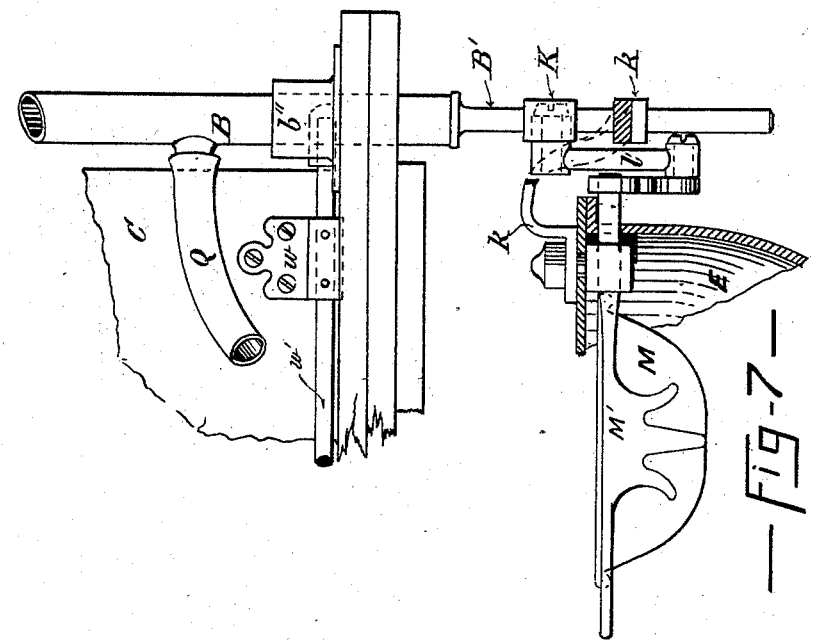
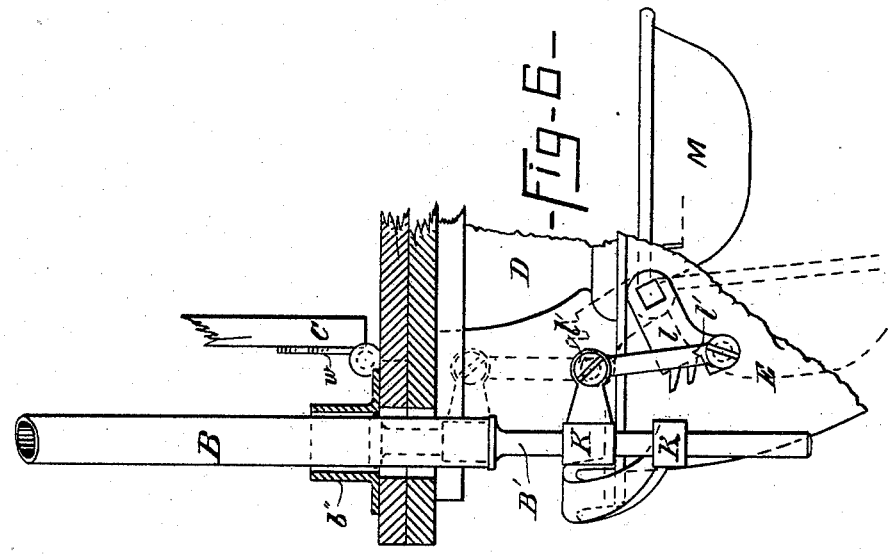
WITNESSES
C. H. Thompson
Gertrude H. Anderson
INVENTOR
Henry C. Hart

UNITED STATES PATENT OFFICE.

HENRY C. HART, OF DETROIT, MICHIGAN.

WATER-CLOSET.

SPECIFICATION forming part of Letters Patent No. 442,041, dated December 2, 1890.

Application filed August 5, 1890. Serial No. 361,039. (No model.)

*To all whom it may concern:*

Be it known that I, HENRY C. HART, of Detroit, in the county of Wayne and State of Michigan, have invented a new and useful Improvement in Water-Closets, of which the following is a specification.

My invention consists in an improvement in water-closets, hereinafter fully described and claimed.

Figure 1 is a side elevation, partly in section. Fig. 2 is a plan view omitting the tank. Fig. 3 is a rear elevation. Figs. 4 and 5 are side and rear views of the locking-pawl and its connections. Figs. 6 and 7 are enlarged side and rear elevations of a portion of the mechanism.

This apparatus is similar to that shown and described in my application for patent filed May 12, 1890, Serial No. 351,503, the main difference being that in this apparatus the measuring-pipe serves as a balance for the pan, holding the pan raised when said pipe is full of water, and vice versa.

A represents an elevated tank having an outlet-pipe $c$, the lower end of which is connected with a three-way cock F.

C represents the lid of the closet, connected rigidly by hinges $w$ $w$ with a spindle $w'$, one end of which turns in a bearing I on the closet, and the other end of which (marked $p$) is connected with the plug $o$ of cock F.

D represents the bowl, E the hopper, $n$ the casing, and $m$ the seat, of a pan-closet.

M represents a swinging service-pan carried on shaft M′, journaled in the hopper.

$l$ represents a lever secured on shaft M′, having one or more teeth formed on its end.

B represents a measuring-pipe rising above the level of the water in tank A. As shown, a smaller pipe $b$ rises through a passage $b'$ in tank A, which passage guides and steadies said pipe B.

Q represents a flexible pipe or hose which connects pipe B with cock F, and the outlet $g'$ of cock F is connected with the interior of bowl D at $h$ by pipe $g$. $b''$ represents a guide for the lower part of pipe B.

B′ represents a rod secured to the lower end of pipe B and continuing downward, passing through the end of a spring $k$, which serves both as a guide and a stop.

K represents an arm secured on rod B′, and the end of said arm is connected by a link $l'$ with lever $l$, both ends of said link being pivotally connected, so that the whole weight of pipe B is carried by lever $l$, thus balancing pipe B and pan M on shaft M′.

$e$ represents an arm secured on lid C, carrying at its end a pivoted dog $f$, which swings freely in one direction, but is prevented from swinging in the other direction by its upper end $f'$ coming in contact with the end $e'$ of arm $e$.

I′ represents a pawl adapted to engage with the teeth on lever $l$, and held in proper position therefor by a counter-weight $i$. This pawl is secured on a shaft journaled in the hopper.

I″ represents a lever secured on the shaft which carries pawl I′, and has a curved end, adapting it to be operated by dog $f$, and when said lever is forced downward by said dog pawl I′ is withdrawn from engagement with lever $l$.

J represents a rod by which pawl I′ can be pushed back and held out of engagement with lever $l$ when the water in tank A is exhausted.

The operation of my invention is as follows: When lid C is closed, the three-way cock F is in such position that water from tank A flows through pipe $c$, cock F, and hose Q, into pipe B, thus filling said pipe with water to the level of the water in tank A. In this condition pipe B, with its contents resting upon lever $l$ by means of arm K and link $l'$ overbalances pan M and holds it raised, as shown in full lines in Fig. 6. In this position pawl I′ locks lever $l$, as shown in Fig. 1. When lid C is raised, the plug of cock F is rotated so as to close the connection between pipes $c$ B and open the connection from pipe B to the outlet $g'$ of said cock, thus discharging the water in pipe B into the pan M. The pan and its contents are now heavier than pipe B, and said parts would assume the position shown in dotted lines in Fig. 6, but for pawl I′, which locks lever $l$. When lid C is again closed, the dog $f$ rides down lever I″, thus temporarily withdrawing pawl I′ from lever $l$ and permitting the pan to dump. The connection between pipe B and the outlet $g'$ of cock F is closed, and that between pipes $c$ B is opened by closing lid C, so that pipe B overbalances pan M and raises said pan to its normal position, in which it is locked by pawl I'. When there is no water in tank A, the pawl I' may be pushed back by rod J, thus allowing pan M to remain down and converting the closet into a hopper-closet.

What I claim as my invention, and desire to secure by Letters Patent, is—

1. The combination, with a water-closet bowl, a swinging service pan therefor, and a tank, of a movable measuring-vessel receiving water from the tank, and connections acted on by the measuring-vessel when supplied with water to balance the weight of the service-pan, substantially as described.

2. In a water-closet, the combination of the following elements: an elevated water-tank having an outlet-pipe, a three-way cock, and a movable measuring-vessel connected with said cock by a flexible connection and carried on a movable support, which also supports a swinging service-pan, substantially as shown and described.

HENRY C. HART.

Witnesses:
C. H. THOMPSON,
GERTRUDE H. ANDERSON.